(12) United States Patent
Choi

(10) Patent No.: US 6,652,748 B1
(45) Date of Patent: Nov. 25, 2003

(54) TREATED FILTER MEDIA AND FRAME

(75) Inventor: Kyung-Ju Choi, County of Jefferson, KY (US)

(73) Assignee: AAF-McQuay, Inc., Louisville, KY (US)

( * ) Notice: Subject to any disclaimer, the term of this patent is extended or adjusted under 35 U.S.C. 154(b) by 0 days.

(21) Appl. No.: 09/633,922

(22) Filed: Aug. 8, 2000

Related U.S. Application Data

(63) Continuation-in-part of application No. 09/236,207, filed on Jan. 23, 1999, now abandoned.

(51) Int. Cl.$^7$ .......................... B01D 39/00; B01D 46/00
(52) U.S. Cl. .................. 210/232; 210/495; 210/504; 210/505; 210/508; 55/491; 55/524; 55/DIG. 24; 55/DIG. 31; 95/285
(58) Field of Search .................. 210/193, 495, 210/506, 507, 508, 232, 504, 505; 55/491, 524, DIG. 24, DIG. 31; 95/285

(56) References Cited

U.S. PATENT DOCUMENTS

| | | | |
|---|---|---|---|
| 2,403,261 A | 7/1946 | Clark | 183/75 |
| 2,751,039 A | * 6/1956 | Hanly | |
| 2,751,040 A | 6/1956 | Hanly | 183/44 |
| 3,133,884 A | 5/1964 | Graham et al. | 55/524 |
| 3,501,325 A | 3/1970 | Hamilton | 106/287 |
| 4,460,394 A | 7/1984 | Wrightson | 55/491 |
| 4,608,173 A | 8/1986 | Watanabe et al. | 210/502.1 |
| 5,124,177 A | 6/1992 | Kasmark, Jr. et al. | 427/202 |
| 5,269,925 A | 12/1993 | Broadhurst | 210/488 |
| 5,338,340 A | 8/1994 | Kasmark, Jr. et al. | 96/135 |
| 5,525,136 A | * 6/1996 | Rosen | 55/486 |
| 5,573,811 A | * 11/1996 | Townsley | 55/524 |
| 5,951,745 A | 9/1999 | Gibbs et al. | 55/524 |

FOREIGN PATENT DOCUMENTS

| | | |
|---|---|---|
| DE | 2632511 | 1/1978 |
| EP | 9853899 | 12/1998 |

OTHER PUBLICATIONS

European Search Report for EP200195 May 18, 2000–Berlin (1 pg).
Patent Abstracts of Japan for J.P63134021, Jun. 1988.

* cited by examiner

*Primary Examiner*—Robert Popovics
(74) *Attorney, Agent, or Firm*—Polster, Lieder, Woodruff & Lucchesi, L.C.

(57) ABSTRACT

A filter medium and frame therefore wherein the filter medium is treated by a novel adhesive comprised of a major portion by weight of an oil group consisting of vegetable and animal oils and a minor portion of a preselected thickening material with the rigidity of the filter medium being obtained by sandwiching the filter medium between joined mating upstream and downstream frame members.

3 Claims, 2 Drawing Sheets

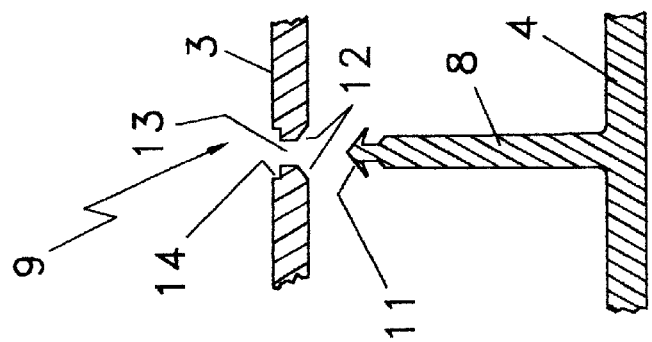
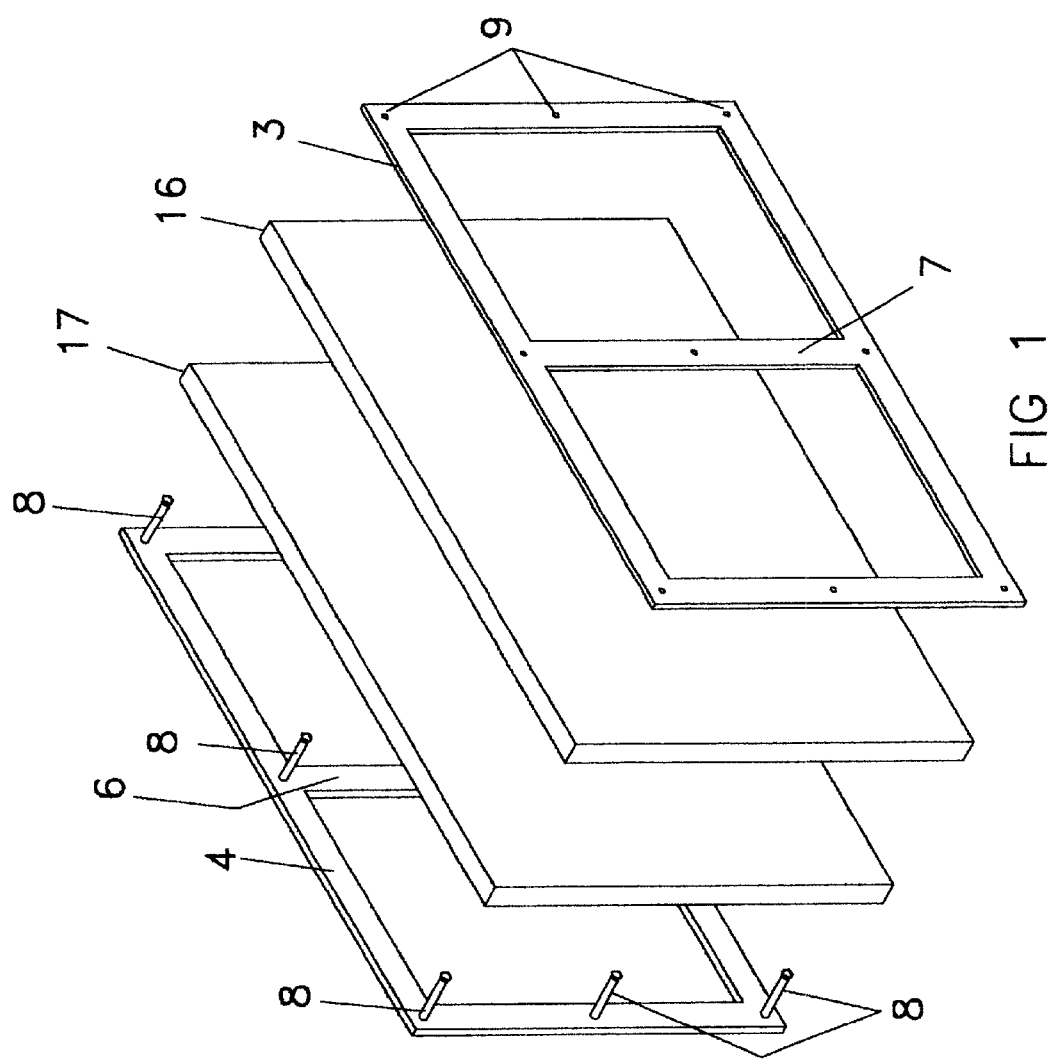

TREATED FILTER MEDIA AND FRAME

This is a continuation-in-part of parent application Ser. No. 09/236,207 filed Jan. 23, 1999 now abandoned.

BACKGROUND OF THE INVENTION

The present invention relates to a unique and novel filter media and more particularly to a unique adhesive treatment for filter media and a mounting frame for such media.

It has been long known in the filtering art that in order to provide a viscous impingement fibrous filter, a suitable adhesive medium should be used on the filter media. In this regard, attention is directed to U.S. Pat. No. 4,608,173, issued to K. Watanabe et al on Aug. 26, 1986, which teaches a cationic polyacrylide coating on filter fibers; U.S. Pat. No. 5,124,177 issued to J. W. Kasmark, Jr. et al on Jun. 23, 1992, which teaches the use of one of several organic adhesives, such as an organic latex or acetate combined with activated odor removing particles, such as carbon or silica gel; U.S. Pat. No. 5,269,925, issued to T. E. Broadhurst on Dec. 14, 1993, which teaches the use of mineral coated fibers with grit added to provide surface roughness; U.S. Pat. No. 5,338,340, issued to J. W. Kasmark, Jr. et al on Aug. 16, 1994, which teaches the use of an organic, synthetic coating substance such as latex or an acetate combined with odor-removing activated particles, such as carbon or silica gel and the like, and, U.S. Pat. No. 5,525,136, issued to R. M. Rosen on Jun. 11, 1996, which teaches the use of oils—including vegetable oil as a fibrous filter coating.

In accordance with the present invention, a new and useful fibrous filter media coating is provided which greatly improves filtration efficiency of certain particle sizes, which is comparatively inexpensive to make, install and use in a straightforward manner, which has a high system performance efficiency and integrity and, which minimizes liberation of respiratory irritating gases—an undesirable fault common to some past adhesives. In addition, the present invention provides a novel frame support, for filter media including—but not limited to—filter media which can be coated with the novel adhesive herein described. The novel frame support also herein described, is efficient, economical, and straightforward in manufacture, use and assembly, providing desired firmness and stability characteristics to the novelly treated filter media during filtering operations.

Various other features of the present invention will become obvious to one skilled in the art upon reading the disclosure set forth herein.

BRIEF SUMMARY OF THE INVENTION

In accordance with the present invention, a novel medium for removing particulates from a fluid stream is provided comprising: a porous fiber filter medium and an adhesive coating therefor selected from a preselected percentage mixture of a major portion of a pure oil group consisting of vegetable, agricultural, mineral or animal oils and a minor portion of thickening material. In addition, a novel filter frame is provided for sandwiching filter medium therebetween—such as, but not limited to the novel filter medium herein—comprising a pair of substantially rigid fluid flow-through support frame members, at least one of which frame members includes spaced, normally extending male frame closing posts adapted to extend through the filter medium, the other frame member including spaced female receptacles aligned with the closing posts to nestingly engage and close with the male frame closing post extremities.

It is to be understood that various changes can be made by one skilled in the art in one or more of the several parts of the filter arrangements disclosed herein without departing from the scope or spirit of the present invention.

BRIEF DESCRIPTION OF THE DRAWINGS

Referring to the drawings which disclose one advantageous embodiment of the present invention including the novel and unique frame member in which the inventive media can be mounted:

FIG. 1 is an exploded isometric view of the novel frame members prior to assembly as a frame, FIG. 2 is an enlarged, cross-sectional, side view of a portion of the frame members of FIG. 1 disclosing in more detail, a male closing post and an aligned cooperative female receptacle arrangement;

DETAILED DESCRIPTION OF THE DRAWINGS

Figure 3:
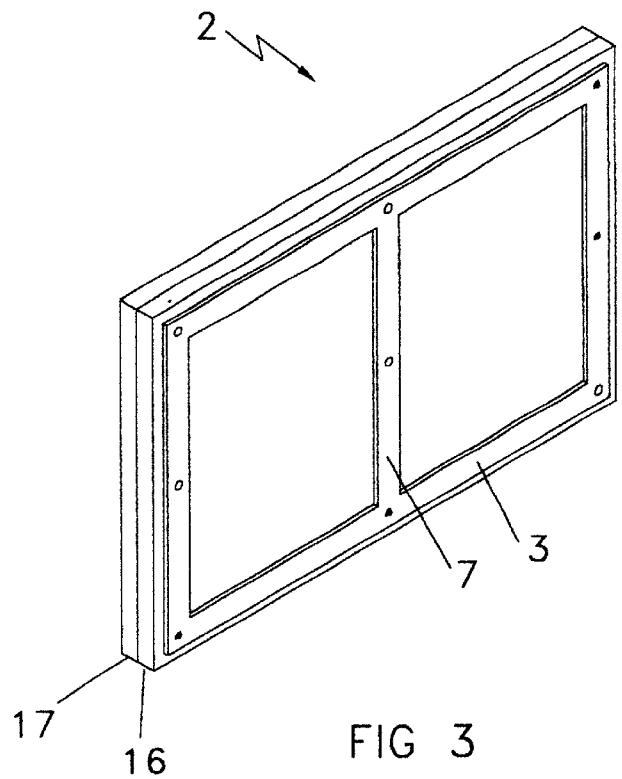
FIG. 3 is an isometric view of two layers of fibrous filter medium coated with an inventive adhesive material and including a frame arrangement (only one frame member being shown) in accordance with the structure of FIGS. 1 and 2.

Referring to the exploded isometric view of FIG. 1, a filter frame 2 is disclosed. Frame 2 as disclosed is geometrically configured and sized to receive one or more sheets of filter medium therebetween and is here shown as being of rectangular shape. It is to be understood that frame 2 can be geometrically configured to be any one of a number of other geometric configurations, depending on the structural environment in which it is to be assembled. Frame 2 includes a pair of substantially rigid fluid flow-through support frame members or panels 3 and 4 which can be formed from any one of a number of suitably rigid materials such as, but not limited to, woods, metals, cardboards or plastics. As shown in FIG. 1, the rectangular frame panels 3 and 4 are configured to be in mating and facing relation to include central grid bars 6 and 7, providing two (2) flow-through areas. At least one of the frame members or panels 3 and 4 can include normally extending frame male closing posts 8 which are adapted to extend through the filter medium sheet or sheets to be sandwiched between the panels. The opposite mating panel can be provided with female receptacles 9, which are spaced and aligned with posts 8 to nestingly engage with and close with the post extremities. It is to be understood that anyone of a number of mating male spaced post and aligned female receptacles therefor can be utilized and distributed along either or both of the panels as needed. Further, any number of grid bars can be employed to provide divided flow-through passages, depending upon the size and configuration designs of associated structure.

Referring to FIGS. 1 and 2 of the drawings, it can be seen that in the disclosed embodiment, frame member or panel 4 is provided with nine (9) spaced male posts 8 and frame member or panel 3 is provided with nine (9) spaced and aligned female receptacles 9, as can be seen in enlarged FIG. 2. Each male post 8 is provided with a flexible, arrow-shaped tip 11 contoured and shaped to engage with an inwardly sloping entrance shoulder 12 of an aligned female receptacle 9 to be compressed to pass through an aperture 13 and to then expand and lockingly nest with a substantially flat enlarged accommodating recess 14 of female receptacle 9. Thus, as can be seen in FIG. 3 of the drawings, two stacked and aligned sheets of filter medium 16 and 17 can be readily assembled to form as filter frame 2 with the media sandwiched between frame members or panels 3 and 4 and with the male posts 8 and female receptacles 9 in locking engagement.

Figure 4:
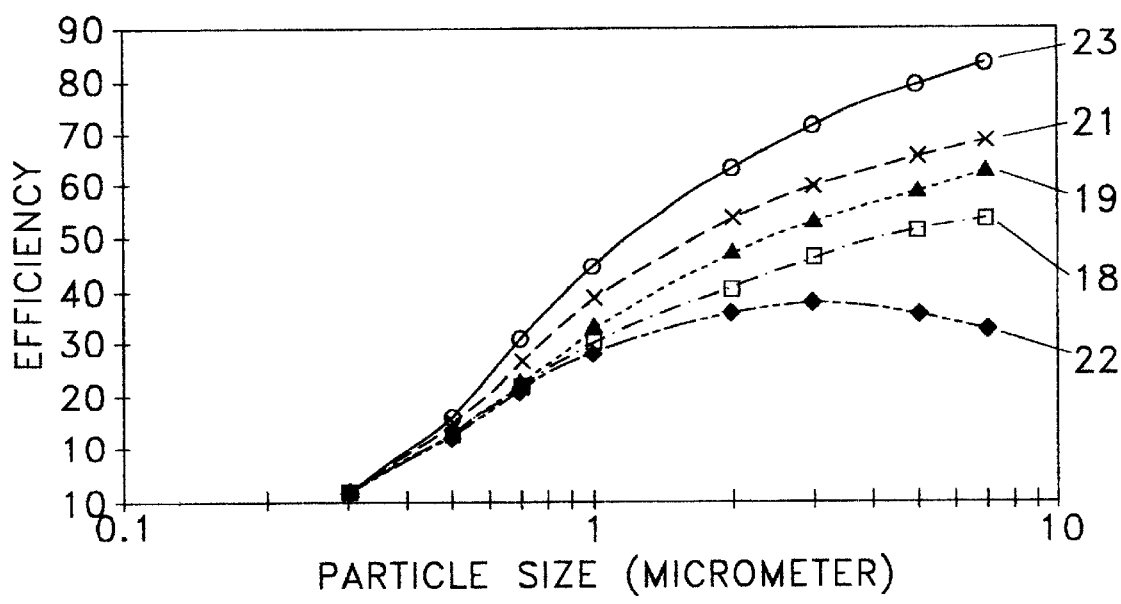
FIG. 4 is a filtration efficiency representative graph comparing the filtration efficiency, at particle sizes of more than zero point three (0.3) micrometers of a filter medium treated with a herein disclosed inventive adhesive with the filtration efficiencies of four other filter media, three filter media of which were each treated with the same adhesive amounts of one of three known commercial adhesives and a fourth filter medium which was not treated.

In accordance with still another feature of the present invention, each of the filter medium sheets 16 and 17 can be coatingly treated with one or more of the novel adhesive oils of the present invention in order to obtain an improved filter efficiency and dust holding capacity with comparatively minimal initial resistance or static pressure drop across the treated filter media. The present invention provides for treating any one of several known fibrous filter media such as, but not limited to, spun or chopped glass fibers, synthetic fibers or natural fibers, with a novel adhesive coating selected from a preselected percentage mixture of a major portion of a pure oil group consisting of vegetable, agricultural, mineral and animal oils and a minor portion of preselected thickener material which serves as an oil thickener to increase flow resistance, along with other additives such as anti-oxidants and flame retardants. The adhesive coating mixture comprises a pure oil group in the range of approximately ninety (90) to one hundred (90–100) percent by weight of said mixture or pure oil and a thickener in the range of approximately zero to ten (0.0–10) percent by weight of the mixture and advantageously an oil group of approximately ninety-five (95) percent by weight of the mixture and a silica of approximately five (5) percent by weight of the mixture. The oil of the group, including the thickener, can desirably have a viscosity flow rate in the range of zero point five (0.5) to five hundred (0.5–500) poise and advantageously approximately twelve point five (12.5) poise and can be one or a combination of pure oils extracted from soybean, corn, cotton seed, sunflower seed, safflower, canola, nut, sesame, olives, apricots, grape seeds, palm cedar, seal, mink, fish or other fatty oils or pure mineral oil advantageously with a molecular formula $CH_3(CH_2)_nCH_3$, commercially available under the trade name "AVATECH", from Avatar Corporation, 500 Central Avenue, University Park, Ill., 60466. The thickener of the minor portion can be a group consisting of silica, treated clay, inorganic powder or a polymeric material or a preselected mixture by weight of the same, with the mixture having a viscosity in the range of zero point five to five hundred (0.5–500) poise, advantageously at approximately twelve point five (12.5) poise, and advantageously can be a silica material. Referring to the representative efficiency graph in FIG. 4 of the drawings, curves are shown, which plot and compare the relative efficiencies of five (5) identical filter media. Three (3) of the curves represent identical media which were treated, as above described, separately with three commercially available different adhesives, namely a commercial adhesive known as chlorinated paraffin and designated by the rectangular mark and reference numeral 18, a commercial adhesive known as polybutene and designated by the triangular mark and reference numeral 19, and, a commercial adhesive known as petroleum hydrocarbon and designated by the cross mark and reference numeral 21. A fourth curve designated by the diamond mark and reference numeral 22 represents an identical filter media which was untreated and which does, in fact, show the lowest efficiency. The fifth curve designated by the circular mark and reference numeral 23 shows the highest efficiency of all. It was treated by an inventive adhesive of a mixture of ninety-five (95) percent by weight of soybean oil and five (5) percent by weight of silica. Although not demonstrated by graphs for other oils in the inventive group of oils and oil thickeners, similar efficiency results to that of the representative efficiency graph would be obtained.

The invention claimed is:

1. A filter frame and filter medium arrangement comprising: a pair of substantially rigid flow-through support frame members, at least one of which frame members includes spaced, normally extending male frame closing posts adapted to extend through said filter medium and the other of which includes spaced female receptacles having aligned apertures with contoured peripheries to receive and nestingly engage and close with said closing posts, said closing posts having resilient arrow tips at the distal extremities thereof and said aligned apertures on said female receptacles including inwardly sloping entrance peripheries and substantially flat exit recesses whereby said resilient arrows on said closing posts are closed by said sloping entrance peripheries to expand after passing through said apertures to nest with said flat exit recesses to hold said support frame members together with said filter medium sandwiched therebetween, said filter medium being a porous fiber medium having an adhesive coating applied thereto, the adhesive coating comprising a major portion being an oily group mixture consisting of vegetable, agricultural, mineral, and animal oils and comprising approximately ninety-five (95) percent by weight of said mixture and a minor viscous portion of approximately five (5) percent by weight of a preselected thickener of approximately twelve point five (12.5) poise; said oil being chosen from the group consisting of oils extracted from soybean, corn, cottonseed, sunflower seed, safflower, nut, sesame, olives, canola, apricots, grape seeds, palm, cedar, seal, fish, fatty oils, mink, mineral oil, and combinations thereof; and said minor viscous portion comprising a thickener chosen from the group consisting of silica, treated clay, inorganic powder of a polymeric material, and combinations thereof.

2. The filter medium of claim 1, wherein said adhesive coating comprises approximately 90–100% by weight of said pure oil and approximately 0.0–10% by weight of said thickener.

3. The combination of claim 1, wherein said adhesive coating has a viscosity in the range of 0.5–500 poise.

* * * * *